(12) United States Patent
Giraldo (10) Patent No.: US 8,384,985 B2
(45) Date of Patent: Feb. 26, 2013

(54) TRANSFLECTIVE ELECTROWETTING DISPLAY DEVICE

(75) Inventor: Andrea Giraldo, Den Bosch (NL)

(73) Assignee: Samsung LCD Netherlands R & D Center B.V., Eindhoven (NL)

( * ) Notice: Subject to any disclaimer, the term of this patent is extended or adjusted under 35 U.S.C. 154(b) by 99 days.

(21) Appl. No.: 12/794,018

(22) Filed: Jun. 4, 2010

(65) Prior Publication Data

US 2010/0284056 A1 Nov. 11, 2010

Related U.S. Application Data

(63) Continuation of application No. PCT/EP2008/066912, filed on Dec. 5, 2008.

(30) Foreign Application Priority Data

Dec. 6, 2007 (GB) .................................. 0723861.1

(51) Int. Cl.
*G02B 26/00* (2006.01)
(52) U.S. Cl. ...................................................... 359/292
(58) Field of Classification Search .......... 359/290–292, 359/295, 298, 665–668, 228; 345/48, 55, 345/84, 85, 105; 349/193, 200
See application file for complete search history.

(56) References Cited

U.S. PATENT DOCUMENTS

| 7,522,345 B2 * | 4/2009 | Oh et al. ....................... 359/665 |
| 7,780,874 B2 * | 8/2010 | Liogier D'Ardhuy et al. .............................. 252/500 |
| 2005/0128389 A1 | 6/2005 | Yan |
| 2006/0285067 A1 | 12/2006 | Kim |
| 2008/0137213 A1 * | 6/2008 | Kuiper et al. .................. 359/666 |

FOREIGN PATENT DOCUMENTS

| WO | 03/071346 A1 | 8/2003 |
| WO | 2004/104670 A1 | 12/2004 |
| WO | 2004/104671 A1 | 12/2004 |
| WO | 2006/017129 A | 2/2006 |
| WO | 2006/021912 A2 | 3/2006 |
| WO | 2007/141218 A1 | 12/2007 |

OTHER PUBLICATIONS

International Search Report from PCT/EP2008/066942, mailed Jul. 2, 2009.
UK Search Report from GB0723861.1, mailed Apr. 9, 2008.
International Search Report and Written Opinion from PCT/EP2008/066912, mailed Mar. 30, 2009.

* cited by examiner

*Primary Examiner* — Tuyen Tra
(74) *Attorney, Agent, or Firm* — BainwoodHuang (57) ABSTRACT

Transflective electrowetting display device comprising electrowetting elements, each having at least one reflective area and at least one transmissive area, whereby the surface of the at least one reflective area of the structured reflector is offset in the direction of the viewing side of the display device with respect to the at least one transmissive area of the structured reflector such that a thickness of the second fluid over the at least one transmissive area is greater than the thickness of the second fluid over the at least one reflective area.

17 Claims, 7 Drawing Sheets

TRANSFLECTIVE ELECTROWETTING DISPLAY DEVICE

CROSS REFERENCE TO RELATED APPLICATIONS

This patent application is a continuation of International Patent Application No. PCT/EP2008/066912 filed on Dec. 5, 2008, entitled, "TRANSFLECTIVE ELECTROWETTING DISPLAY DEVICE" which claims priority to GB0723861.1 filed Dec. 8, 2007, the contents and teachings of which are hereby incorporated by reference in their entirety.

DESCRIPTION

Transflective electrowetting display device with enhanced transmissive electro-optical curve.

FIELD OF THE INVENTION

The invention relates to a transflective electrowetting display comprising a plurality of electrowetting elements having a first support plate facing a viewing side of the display and a second support plate facing a rear side of the display. A transflective display can form an image in a reflective mode using front lighting, e.g. by ambient light, and in a transmissive mode, using back lighting.

BACKGROUND OF THE INVENTION

A transflective electrowetting display is disclosed in international patent application WO2006/017129. This known display includes electrowetting elements having a partially, uniform transmissive layer arranged on the second support plate. In a first mode the layer reflects ambient light incident from the viewing side and in a second mode it transmits light incident from the rear side.

Each electrowetting element comprises a transmissive fluid and a black or coloured fluid. The position of the latter fluid in the electrowetting element can be controlled to transmit or absorb light.

A disadvantage of this known transflective display is that the partially transmissive layer requires a special step in the manufacturing process and is therefore relatively expensive to make. Furthermore, the optical performance in the various modes depends on the values of the transmission and reflection coefficient of the layer and their spectral dependence, which will be affected strongly by variations in thickness. As a result, this manufacturing step will be a very yield sensitive step.

Currently it is known that a structured reflector can be provided in the electrowetting elements that are as such subdivided in a transmissive and reflective area, wherein the transmissive area allows for the transmission of light through the electrowetting display and the reflective area allows for reflection of light on the viewing side.

A disadvantage of such electrowetting displays is that the obtainable contrast of the transmissive area is poor with respect to the reflective area, since the optical path length of a light beam passing through the dark fluid of the display in the reflective mode is longer than it is in transmissive mode. Thus the light absorption, and therefore contrast ratio, in reflective mode is better than in transmissive mode. It is therefore an object of the invention to provide a transflective electrowetting display with enhanced contrast in transmissive mode.

SUMMARY OF THE INVENTION

The object is achieved in a transflective electrowetting display device having a viewing side and a rear side and comprising a plurality of electrowetting elements having a first support plate facing the viewing side and a second support plate facing the rear side, each electrowetting element comprising a space between the first support plate and the second support plate and including a first fluid and a second fluid immiscible with each other, the second fluid arranged on the second support plate, the second fluid absorbing at least a part of the optical spectrum, the space having a boundary in the plane of the second support plate and the position of the second fluid being controllable to cover a predetermined area within the boundary, a structured reflector arranged on the second support plate, covered by the second fluid, comprising within the boundary at least one area transmissive for light incident from the rear side and at least one area reflective for light incident from the viewing side, the at least one transmissive area and the at least one reflective area being arranged such that the predetermined area covered by the second fluid covers a proportion of the at least one reflective area and a substantially same proportion of the at least one transmissive area, whereby the surface of the at least one reflective area of the structured reflector is offset in the direction of the viewing side of the display device with respect to the at least one transmissive area of the structured reflector such that a thickness of the second fluid over the at least one transmissive area is greater than a thickness of the second fluid over the at least one reflective area.

Light incident from the rear side of the transflective electrowetting display device now passes through a thicker layer of second fluid, thereby yielding higher absorption when an electrowetting element according to the invention is covered with second fluid. This results in better contrast ratio for the electrowetting element in transmissive mode.

In an embodiment according to the invention, the thickness of the second fluid over the at least one transmissive area is at least 1.2 times the thickness of the second fluid over the at least one reflective area, making sure that contrast variations due to thickness variations less than the given value are reduced i.e. can be ignored.

In a preferred embodiment according to the invention, wherein the thickness of the second fluid over the at least one transmissive area is substantially equal to two times the thickness of the second fluid over the at least one reflective area, the optical properties, i.e. absorption, of the transmissive area and the reflective area are equal since light incident from the viewing side of the transflective electrowetting display device, reflected by the reflective area passes through the second fluid twice, thus travelling the same optical path length as light incident from the rear of the transflective electrowetting display device through the transmissive area.

In a further embodiment according to the invention, the offset between the at least one reflective area and the at least one transmissive area of the structured reflector is provided by a reflector support layer between the at least one reflective area and the second support plate, creating at least one hollow in the reflector support layer with side walls, the at least one transmissive area being at the bottom of said at least one hollow. Providing a reflector support layer is an effective step in manufacturing transflective electrowetting devices.

In a further embodiment according to the invention the second fluid over the at least one transmissive area is controllable with a voltage less than proportional with the layer thickness of said second fluid with respect to layer thickness of second fluid over the at least one reflective area. A person skilled in the art would expect that a voltage controlling the thicker second fluid over the at least one transmissive area to be proportional to the ratio of thickness of the controllable layer over the at least one transmissive area and the at least one reflective area respectively. However due to the unexpected cohesive action from the controllable layer over the at least one reflective area, dragging the second fluid over the at least one transmissive area along, the control voltage over the at least one transmissive area may be less than proportional to the layer thickness of the second fluid over the at least one transmissive area.

In a preferred embodiment according to the invention, the at least one transmissive area is controllable with the same voltage as the at least one reflective area. It has been found that the cohesive effect of the second fluid over the at least one reflective area allows the control voltage of the second fluid over the at least one transmissive area to be reduced to be equal to the control voltage of the controllable layer over the at least one reflective area while the display maintains performance.

In another embodiment according to the invention, the second fluid over the at least one transmissive area is controllable solely by cohesive action from the second liquid over the at least one reflective area. In this case no control, i.e. electrode is needed to control the second fluid over the at least one transmissive area. The second fluid over the at least one transmissive area is pulled away or dragged along when the second fluid over the at least one reflective area recedes. Advantageously a processing step in a process of manufacturing a transflective electrowetting display device of creating electrode under the at least one transmissive area can thus be omitted.

In a further embodiment according to the invention each electrowetting element has a first side and a second side opposite to the first side with respect to the electrowetting element, wherein the at least one transmissive area has an elongated shape extending from the first side to the second side. The second fluid receding from the reflective area along the elongated shape of the at least one transmissive area can now drag along the second fluid from the transmissive area by cohesive action more easily. The cohesive effect however may be reduced by capillary action of edges in the at least one hollow associated with the at least one transmissive area. This embodiment achieves that capillary action withholding the second fluid within the transmissive area is reduced.

The elongated shape of the at least one transmissive area can be oriented in various directions with respect to the shape of an electrowetting element and an at least one reflective area in it, however preferable it extends parallel to a direction of movement of a borderline between an area covered with second fluid receding due to control action whereby the second fluid is repelled from the surface of said electrowetting element.

In a further embodiment according to the invention, the area of the at least one transmissive area is smaller than two times the area of the at least one reflective area. This way it is ensured that the volume of second fluid over the transmissive area is less than the volume of the second fluid over the reflective area, thus ensuring that cohesive action is enhanced.

In a further embodiment according to the invention the at least one transmissive area is completely surrounded by the at least one reflective area. This way it is ensured that the receding of the second fluid starts in the reflective area, having the smaller layer thickness, allowing easy withdrawal of the second fluid. Once the second fluid begins receding from the at least one reflective area it can drag along the second fluid from the at least one transmissive area by cohesive action.

In a further embodiment according to the invention the difference of the thickness of the second fluid over the at least one transmissive area and the thickness of the second fluid over the at least one reflective area is less than a width of the at least one transmissive area. In a further embodiment according to the invention the difference of the thickness of the second fluid over the at least one transmissive area and the thickness of the second fluid over the at least one reflective area is smaller than a length of the at least one transmissive area. Thus the depth of the hollow in the reflector support layer is less than the width or length, thereby ensuring that counteraction by capillary action in the hollow of the transmissive area to the cohesive action of the receding second fluid in the reflective area is reduced.

In another embodiment according to the invention a cross section perpendicular to the surface of the at least one elongated transmissive area has a substantially rectangular shape. A cross section in this shape is easily manufactured using for example ordinary etching techniques in the reflector support layer.

In another embodiment according to the invention the cross section perpendicular to the surface of the at least one elongated transmissive area has rounded corners where the side walls of the substantial rectangular shape touch the transmissive area. Capillary action, withholding the second fluid over the transmissive area, may be further reduced by rounding the corners where the side walls of the hollow formed by the reflector support layer touch the transmissive area. A similar effect is obtained in an embodiment according to the invention wherein the cross section perpendicular to the surface of the at least one elongated transmissive area has rounded corners where the side walls of the substantial rectangular shape touch the reflective area.

This effect can also be achieved in another embodiment according to the invention, wherein a cross section perpendicular to the surface of the at least one elongated transmissive area has a substantially trapezoidal shape as to create a hollow having inclined sidewalls. In a further embodiment of the invention, the at least one reflective area extends over the inclined side walls of the trapezoidal cross section. This has the advantage that possible loss of reflective power of the transflective electrowetting display device due to the inclined walls is compensated and that the contrast ratio in transmissive mode is also optimized.

The various embodiments may be applied in combination with each other, providing additional advantageous effects. Further features and advantages of the invention will become apparent from the following description of preferred embodiments of the invention, given by way of example only, which is made with reference to the accompanying drawings.

DETAILED DESCRIPTION OF THE INVENTION

Through the description and drawings, like numerals refer to like features in the various described embodiments of the invention.

Figure 1:
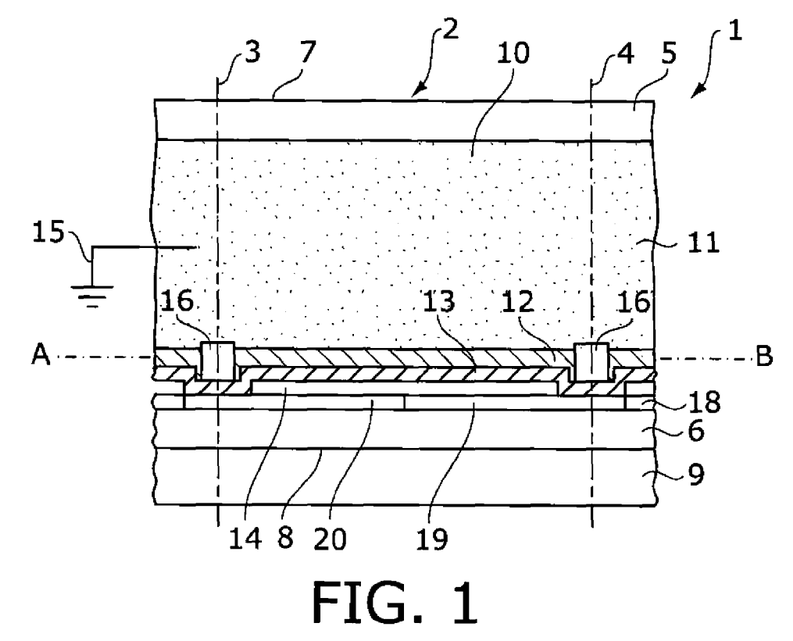
FIG. 1 shows a diagrammatic cross-section of an electrowetting element of a transflective electrowetting display device according to the state of the art.

FIG. 1 shows a diagrammatic cross-section of an embodiment of a transflective electrowetting display 1 device according to the state of the art. The display device includes a plurality of electrowetting elements 2, one of which is shown in the Figure. The lateral extent of the element is indicated in the Figure by the two dashed lines 3, 4. Each electrowetting element comprises a first support plate 5 and a second support plate 6. The support plates may be separate parts of each electrowetting element, but the support plates are preferably in common for the plurality of electrowetting elements. The support plates may be made for instance of glass or polymer and may be rigid or flexible.

The display device has a viewing side 7 on which an image formed by the display device can be viewed and a rear side 8. The first support plate faces the viewing side; the second support plate faces the rear side. The image is formed by light passing through each electrowetting element from the rear side 8 to the viewing side 7, where it is transmitted through the first support plate 5. The image is built up of picture elements. Each picture element may contain a single electrowetting element. Alternatively, each picture element may contain a plurality of electrowetting elements, each electrowetting element forming a subpicture element. The latter picture element may for example include three subpicture elements provided with colour filters for red, green and blue, thereby forming an RGB picture element.

An illumination unit 9 may be attached to the rear side 8 of the plurality of light valves to provide backlighting of the electrowetting elements. The illumination unit may comprise a single white light source. It may also comprise a plurality of colour light sources for spectrum sequential operation of the display. The colours of the light sources may for example be yellow and blue.

The light sources may be conventional light sources, such as fluorescent lamps or LED's. The illumination unit may be of a conventional construction, such as disclosed for instance in international patent application WO 2006/011101.

A space 10 between the support plates is filled with two fluids: a first fluid 11 and a second fluid 12. The first fluid is immiscible with the second fluid. The first fluid is electrically conductive or polar, and may be a water or salt solution such as a solution of KCl in a mixture of water and ethyl alcohol. The first fluid is preferably transmissive. The second fluid is electrically nonconductive and may for instance be an alkane like hexadecane or (silicone) oil.

A hydrophobic layer 13 is arranged on the support plate 6, facing the space 10. The layer may be an uninterrupted layer extending over a plurality of electrowetting elements or it may cover only the cross-section of one electrowetting element. The layer may be for instance an amorphous fluoropolymer layer such as AF1600 or other low surface energy polymers such as Parylene. The hydrophobic character causes the second fluid to adhere preferentially to the support plate 6.

Each electrowetting cell includes an electrode 14 arranged on the support plate 6. The electrode is separated from the fluids by an insulator, which may be said hydrophobic layer 13. In general, the electrode has the same shape as the cross-section of the electrowetting element. A second electrode 15 is connected to the conductive first fluid 11. This electrode can be common to a series of electrowetting cells that share the second fluid, uninterrupted by walls.

The electrodes on the support plate 6 are connected to an electrical terminal on the support plate by a matrix of printed wiring. The electrodes 14 and wiring are preferably transmissive and made of e.g. indium tin oxide. The matrix may include switching elements such as transistors; in this case the matrix is called an active matrix.

The lateral extent of the second fluid 12 is constrained to one electrowetting element by walls 16 that follow the cross-section of the electrowetting cell.

Further details of the electrowetting cell and its manufacture are disclosed amongst others in international patent application WO 2005/098797.

The second fluid absorbs at least a part of the optical spectrum. The fluid may be transmissive for a part of the optical spectrum, forming a colour filter. For this purpose the fluid may be coloured by addition of pigment particles or dye. Alternatively, the fluid may be black, i.e. absorb substantially all parts of the optical spectrum. When a non-zero voltage is applied between the electrodes 14 and 15, electrostatic forces will move the first fluid 11 towards the electrode 14, thereby repelling the second fluid 12 from the area of the electrode 14 to the walls 16 surrounding the area of the electrode. This action causes the second fluid to recede from the optical path that runs from the rear side 8 to the viewing side 7 through the electrowetting element. When the voltage is returned to zero, the second fluid flows back to cover the hydrophobic layer 13. In this way the second fluid forms an electrically controllable light switch.

A structured reflector 18 is arranged on the support plate 6. The structured reflector comprises transmissive areas and reflective areas. The electrowetting element according to the state of the art of FIG. 1 comprises one transmissive area 19 and one reflective area 20 within the cross-section of the electrowetting element 2. When the second fluid 12 is in the repelled state, light from the illumination unit 9 will be transmitted to the viewing side 7 of the display device and ambient light incident from the viewing side will be reflected from the reflective area 20 and returned to the viewing side. When the second fluid 12 covers the hydrophobic layer 13, both light from the illumination unit and from the ambient will be absorbed in the second fluid. An image formed by the plurality of electrowetting elements will be visible in any ambient light level, from bright sunlight to darkness.

The ratio of the transmissive area over the reflective area can be chosen in dependence on the use of the display device.

A display device for indoor use can be designed to make optimum use of the relatively small amount of light available from the illumination unit 9. The efficiency of the use of the light is increased when the ratio is larger than 1, for instance 4. A display device for outdoor use can be designed to make optimum use of the ambient light, and use the illumination unit only for providing some light under low ambient light conditions. In such a case the ratio is preferably smaller than 1, for instance 0.1.

In the above description of the electrowetting cell the second fluid 12 either covers the area of the electrode 14 or is removed from it. It is known in the art that measures can be taken that allow the second fluid to cover the area of the electrode 14 only partially, thereby realizing so-called grey values. The grey values may be obtained by applying an analog voltage to the electrowetting cell that positions the second fluid to cover the area of the electrode only partially. Grey values may also be obtained by applying a pulse width modulated voltage to the electrowetting cell.

Figure 2:
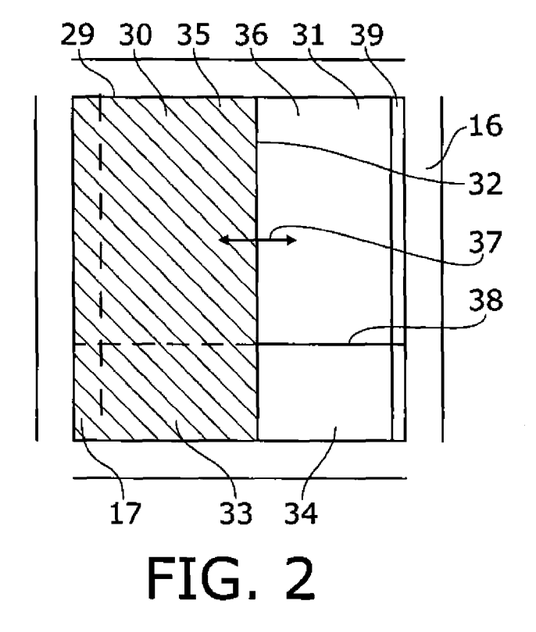
FIG. 2 shows a top view of an electrowetting element of a transflective electrowetting display device according to the state of the art.

FIG. 2 shows a cross-section 29 of the space 1 of a first embodiment of the electrowetting element 2 along the line A-B in FIG. 1 as seen in FIG. 2 from top to bottom along covered area 30, bound by walls 16. The second fluid covers a predetermined area 30 of the cross section. A borderline between the predetermined area 30 and the area 31 of the cross-section not covered by the second fluid is indicated by numeral 32. The transmissive area of the structured reflector is now divided in an area 33 covered by the second fluid and an area 34 not covered by the second fluid. Similarly, the reflective area of the structured reflector is divided in an area 35 covered by the second fluid and an area 36 not covered by the second fluid. The control of the position of the second fluid can move the borderline 32 in a direction 37.

The area 17, schematically indicated by a dashed line, is the area where the second fluid is collected when the electrowetting element is fully on, i.e. the second fluid is fully receded.

Although FIG. 2 shows the borderline 32 as a straight line, it may also be a curved line. The curvature is preferably mirror symmetric around the direction of motion. In the position shown in the Figure, the area 30 covered by the second fluid covers the same proportions of the total transmissive area and the total reflective area. In other words, the ratio area 33/(area 33+area 34) is substantially equal to (area 35/(area 35+area 36). As a result, the gamma curve of the grey levels in the image will be very similar in each illumination mode, whether by back light, ambient light or a combination of the two.

The direction of motion 37 is parallel to a dividing line 38 between the transmissive area and the reflective area, thereby obtaining the same proportions of the transmissive area and the reflective area being covered by the second fluid.

This direction of motion of the second fluid can be achieved, for instance, by arranging a small layer 39 of hydrophilic material along the wall 16. The hydrophilic layer 39 can be arranged on top of the hydrophobic layer 13, to replace locally the hydrophobic layer 13 or to cover the side of wall 16 facing the space 10. The hydrophilic layer 39 operates as an initiator for the oil motion. When the voltage between the electrodes 14 and 15 is turned on, the first fluid 11 will start to repel the second fluid 12 along the hydrophilic layer 39 and recede in the direction 37.

Various variations are possible in the shape of the transmissive area with respect to the reflective area. Furthermore the transmissive area can be subdivided and distributed over the reflective area in various ways.

The initiation of the motion may be improved by providing a small hydrophilic layer on the second support plate near the longer side, the hydrophilic layer having various shapes examples of which may be disclosed in international patent application WO 2006/021912.

Figure 3:
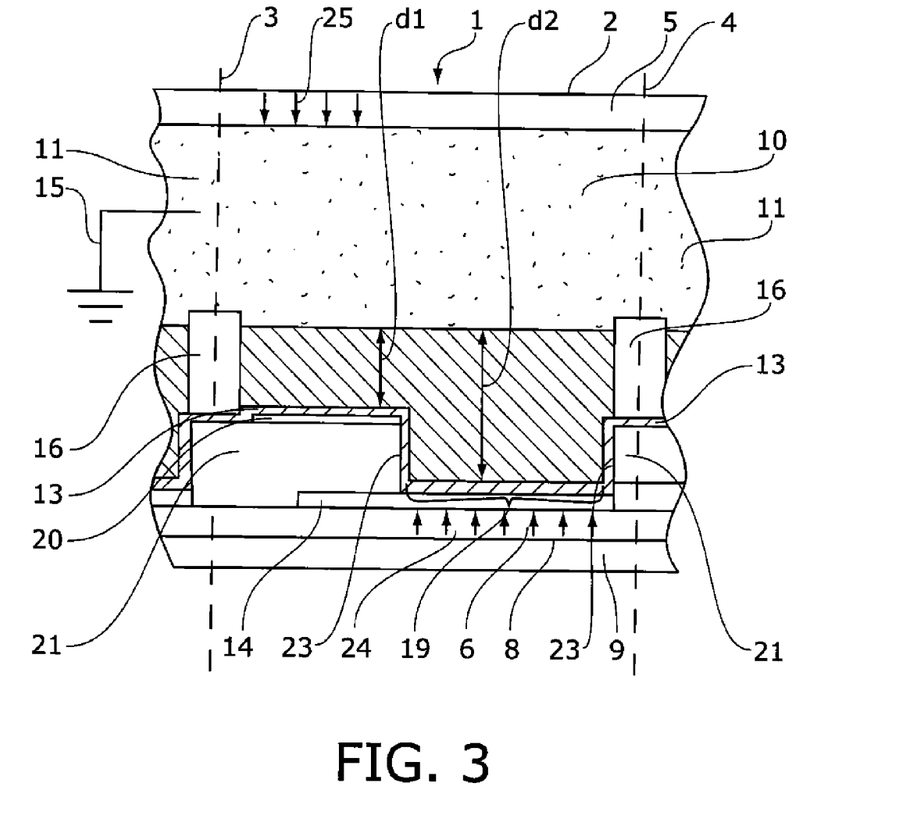
FIG. 3 shows a cross-section of an electrowetting element of a transflective electrowetting display device according to an embodiment of the invention.

FIG. 3 shows a cross section of an electro wetting element according to an embodiment of the invention. In the embodiment, as shown in FIG. 3, the structured reflector 18 of FIG. 1, having a reflective area 20 and a transmissive area 19. In FIG. 3, transmissive area 19 is constituted by at least part of electrode 14. Electrode 14 is transmissive, made from for example Indium Tin Oxide (ITO). Reflective area 20 is formed by a structured reflector arranged on a reflector support layer 21, which reflector support layer 21 surface may be flat (field-shielded design), corrugated (e.g. In-cell Diffuse Reflector), the structured reflector following the reflector support layer 21 surface. The surface of the structured reflector may also be a roughened surface. The structured reflector, if formed from a conducting material such as aluminum, it can be used as an electrode to address and/or control the second fluid 12 over the reflective area 20. If the structured electrode is formed of non-conducting material, a conducting layer may have to b provided on top of the structured reflector.

The reflector support layer 21 may be a passivation layer made of $SiO_2$ or $SiN_x$ or a planarisation layer made of a polymer such as benzocyclobutene (BCB) or polyimide or acrylic resin. The reflector support layer 21 provides an offset between reflective area 20 and transmissive area 19 and is open over the transmissive area 19. Transmissive area 19 and reflective area 20 and side walls 23 of the reflector support layer 21 forming a hollow are all covered by hydrophobic layer 13. Hydrophobic layer 13 is also transmissive. The second fluid 12 has a thickness d1 in the proximity of the reflective area 20 and a thickness d2 in the proximity the transmissive area 19 of the electrode 14.

Incident light 24 from the rear side of the transflective electrowetting display device must now pass through the second fluid 12 over a distance d2 before proceeding towards the viewing side of the transflective electrowetting display device 1.

Incident light 25 from the viewing side of the transflective electrowetting display device 1, proceeding to the reflective area 20 passes through the second fluid 12 over distance d1 twice. By choosing substantially d2=d1×2, the same optical absorption can be achieved for reflective and transmissive light, thereby obtaining a transflective electrowetting display device 1 having the same optical properties in both reflective and transmissive mode. Reflective area 20 can be connected to a first control voltage and electrode 14 can be connected tot a second control voltage.

Thickness d1 is normally in the range of 0.1 micron to 10 micron. Thickness of the second fluid d2 is preferable chosen such that d2/d1 is greater than 1.2.

Figure 4:
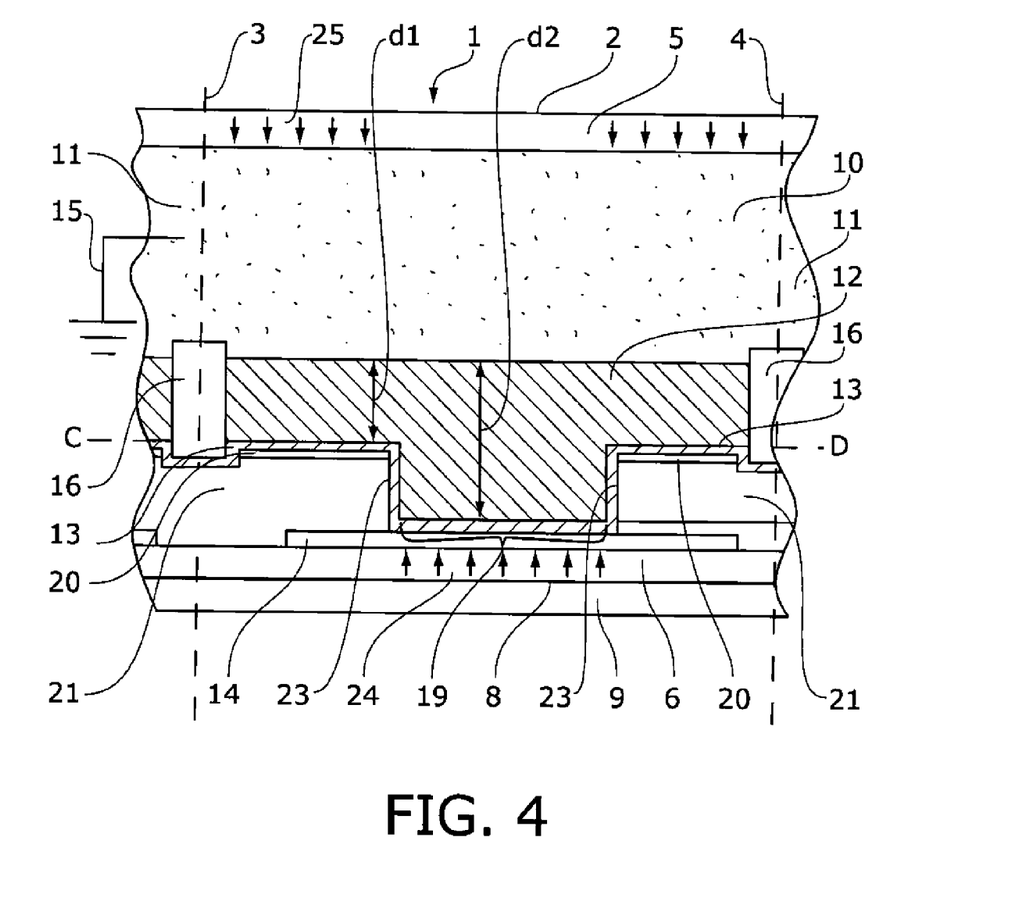
FIG. 4 shows a cross section of an electrowetting element of a transflective electrowetting display device according to a further embodiment of the invention.

FIG. 4 shows a cross section of an electrowetting element of a transflective electrowetting display device according to a further embodiment of the invention. In this embodiment the transmissive area 19 is located towards the central area of the electrowetting element 2. Reflective area 20 now extends from both sides of transmissive area 19 in the cross section of FIG. 4. In further embodiments a plurality of transmissive areas 19 can be provided, each of which can be separated by a reflective area 20 and corresponding reflector support layer 21 and hydrophobic layer 13 on top of the reflective area.

Figure 5:
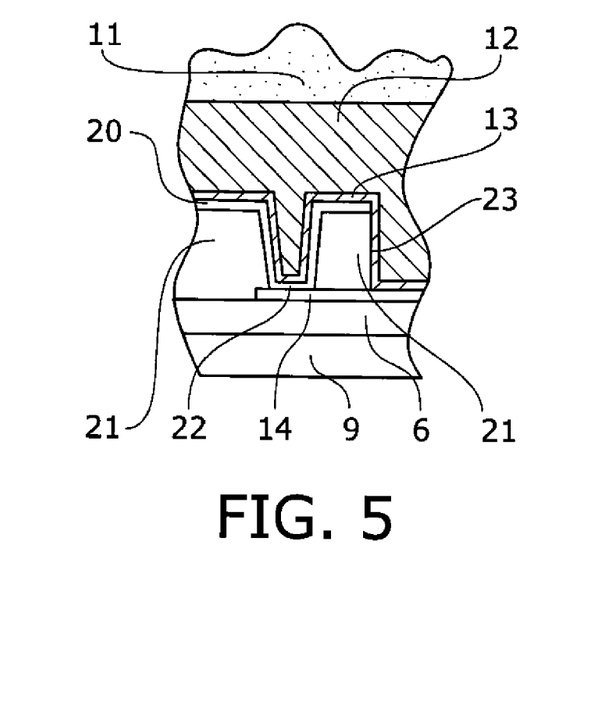
FIG. 5 shows an interconnection of the transmissive and reflective area according to an embodiment of the invention.

FIG. 5 shows an embodiment according to the invention, wherein reflective area 20 is connected to electrode 14 using a via 22. Thus, in this embodiment reflective area 20 and electrode 14 are kept at the same control voltage, thereby simplifying control circuitry needed to control the electrowetting element.

Figure 6:
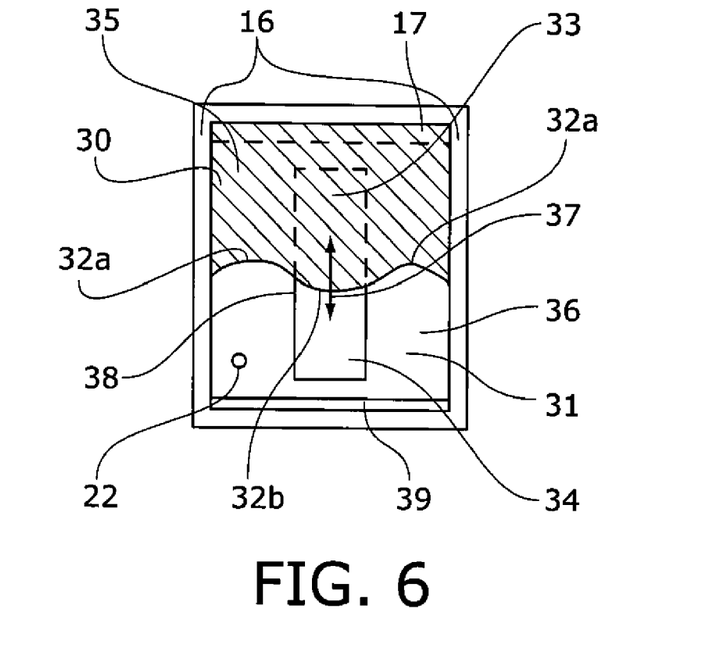
FIG. 6 shows a top view of an electrowetting element of a transflective electrowetting display device according to the embodiment of the invention according to FIG. 4.

FIG. 6 shows a top view of the electrowetting element as viewed along the line C-D in FIG. 4. The second fluid covers a pre-determined area 30 of the cross-section. The transmissive area of the electrowetting element preferably has an elongated shape, such as a rectangle trench stretching out within the reflective area, extending in the direction of movements of the borderline between the area 30 and 31. Operation of the electrowetting cell of the embodiment shown in FIG. 4 is similar to the electrowetting according to the state of the art in FIG. 2, in this respect that when a control voltage is applied to electrode 14 and reflective area 20 the second fluid 12 will repel and recede to one side of the electrowetting element, in FIG. 6 the upper side.

Due to the offset transmissive area 19 and the resulting thicker layer of second fluid 12, the receding borderline 32 will have a curved shape with sections 32a and 32b, over respective reflective area 35, 36 and transmissive area 33, 34 of the electrowetting element. The outward curved shape of the borderline 32b can be explained by the cohesive active of second fluid 12 begin pulled out of the offset transmissive area 19. The inward curved shape of the borderline 32a is due to the described cohesive action of the second fluid 12 receding and capillary action of the dividing line 38 between the transmissive 33, 34 and reflective area 35, 36 (side walls 23 in FIG. 4).

Several variations are possible in the sense that the elongated shape may be stretching from one corner of the electrowetting cell to an opposite corner, whereby the area 17 where the second fluid is collected when it is fully receded may be placed in one corner and the hydrophilic area 39 in the opposite corner.

The transmissive area may comprise a plurality of elongated shapes similar to the shape indicated by dividing line 38. Furthermore a plurality of shapes may be placed in the direction of the receding borderline 32.

Figure 7A:
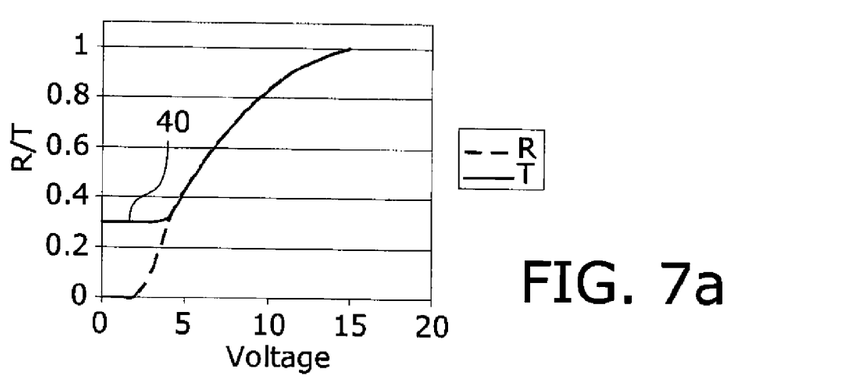
FIG. 7a shows typical normalised electro-optical curves for the reflective and transmissive parts of an electrowetting element according to the state of the art.

FIG. 7a shows electro-optical curves for the reflective area with dashed line and the transmissive area with solid line of the transflective electrowetting display device 1, according to the state of the art. An electro-optical curve shows either a reflectivity coefficient or a transmission coefficient of a display device versus control voltage. Since the layer thickness of fluid 12 is equal for the transmissive and reflective area, the two electro-optical curves overlap, however the electro-optical curve for the transmissive area has an initial curve 40 constituting an apparent offset well above zero due to limited thickness, i.e. absorption, of the second fluid layer 12 in transmissive mode.

Figure 7B:
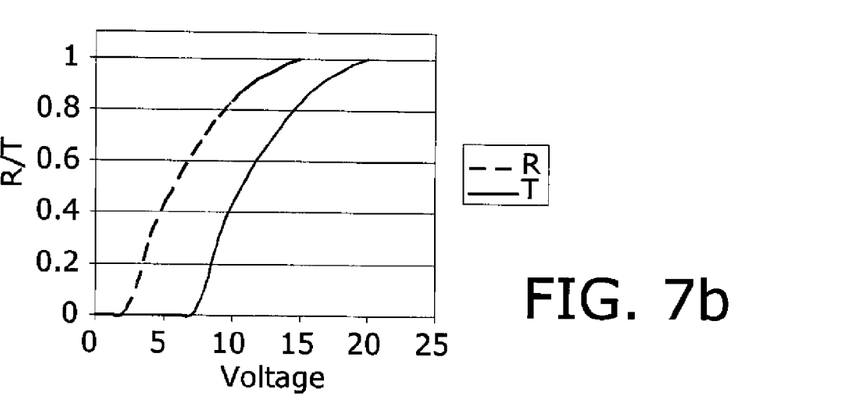
FIG. 7b shows typical normalised electro-optical curves for respective transmissive and reflective areas of an electrowetting element according to an embodiment of the invention.
Figure 7C:
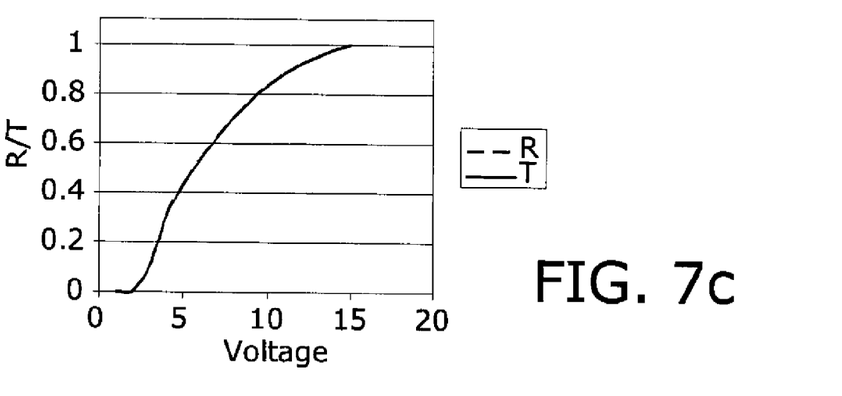
FIG. 7c shows typical normalised electro-optical curves for respective transmissive and reflective parts of an electrowetting element according to an other embodiment of the invention.

This apparent offset 40 in FIG. 7a can be remedied by an increased layer thickness of the second fluid 12 for the transmissive area according to an embodiment of the invention, however in order to clear this area with second fluid 12 a person skilled in the art would expect that a higher voltage needs to be applied to electrode 14, as shown in FIG. 7b. According to the invention the receding second fluid 12 over the reflective area pulls back the second fluid 12 over the transmissive area by means of cohesion. Thus the electrode 14 underneath the transmissive area may be driven at a lower voltage than a person skilled in the art would expect. In an embodiment according to the invention the control voltage at the transmissive area is chosen to be the same voltage as the reflective area 20, thereby obtaining electro-optical curves that overlap as shown in FIG. 7c.

In a preferred embodiment, where the cohesive action is optimized so that the second fluid over the transmissive area is removed by cohesion to the second fluid receding from the reflective area, the volume of second fluid over the transmissive area has to be relatively small with respect to the volume of second fluid over the reflective area. With the ratio of thickness d2 of the second fluid 12 over the transmissive area and d1 over the reflective area of 2, this can be achieved by making the ratio between the reflective area and the transmissive area substantially equal to or greater than 2. Preferably the transmissive area is completely surrounded by reflective area. Especially where the receding of second fluid starts at area 39 in FIG. 6 for example, it is advantageous that the second fluid 12 starts receding from the reflective area since the thickness of the second fluid 12 layer is relatively small. Furthermore is the depth of the hollow formed by walls 23, equal to d2–d1, less than width and/or length of the transmissive area, thus reducing the capillary action.

Figure 8:
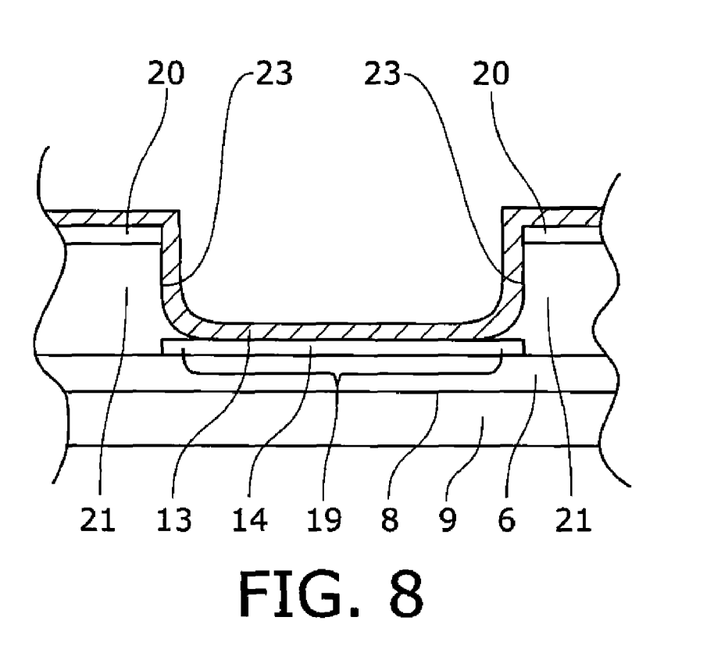
FIG. 8 shows a cross-section of an electrowetting element according to an embodiment of the invention.

As described in relation to FIG. 4, the cohesive action of the receding second fluid 12 may be hampered by capillary action of the perpendicular side walls 23 of the reflector support layer 21 an hydrophobic layer 13. This may be reduced in a further embodiment according to the invention, as shown in FIG. 8, by curved corners extending from the sidewalls 23 to the hydrophobic layer 13.

Figure 9:
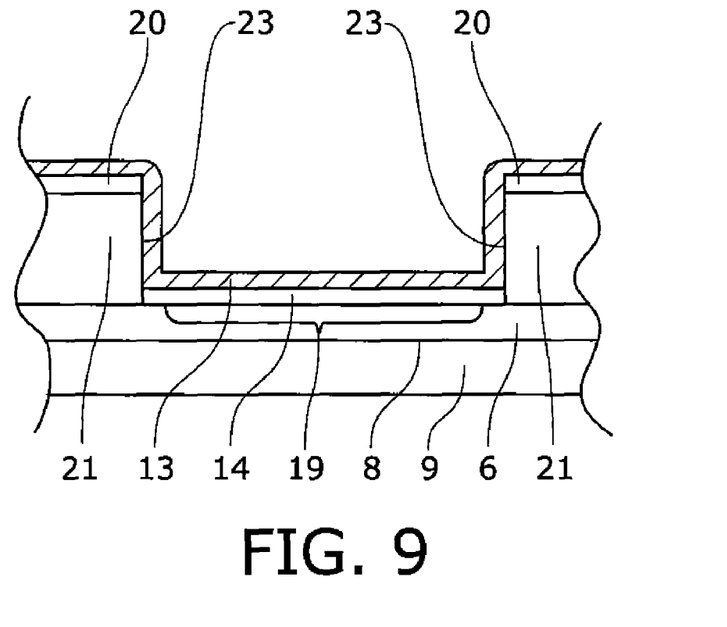
FIG. 9 shows a cross-section of a part of an electrowetting element according to an other embodiment of the invention.

Alternatively curved corners may be arranged at the respective edges of hydrophobic layer 13 on top of the reflective area 20, as shown in FIG. 9.

Figure 10A:
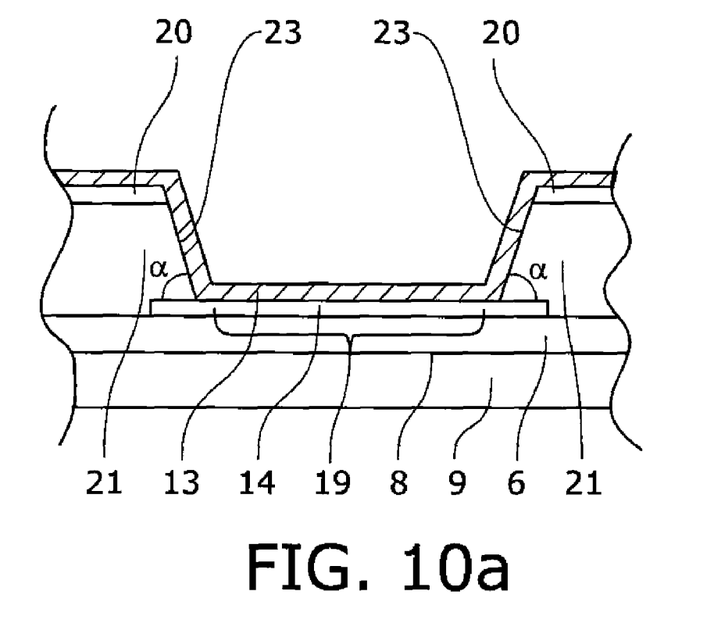
FIG. 10a shows a cross-section of a part of an electrowetting element according to an other embodiment of the invention.

Alternatively and additionally sticking of the second fluid 12 to the corners of side walls 23, due to capillary action with hydrophobic layer 13 may also be reduced in a further embodiment of the invention as shown in FIG. 10a, where the side walls 23 are arranged inclined with an angle α with respect to hydrophobic layer 13. The angle α is preferably between 45 degrees and 90 degrees. The inclined side walls 23 of FIG. 10a may be combined with the curved corners of FIGS. 8 and/or 9.

Figure 10B:
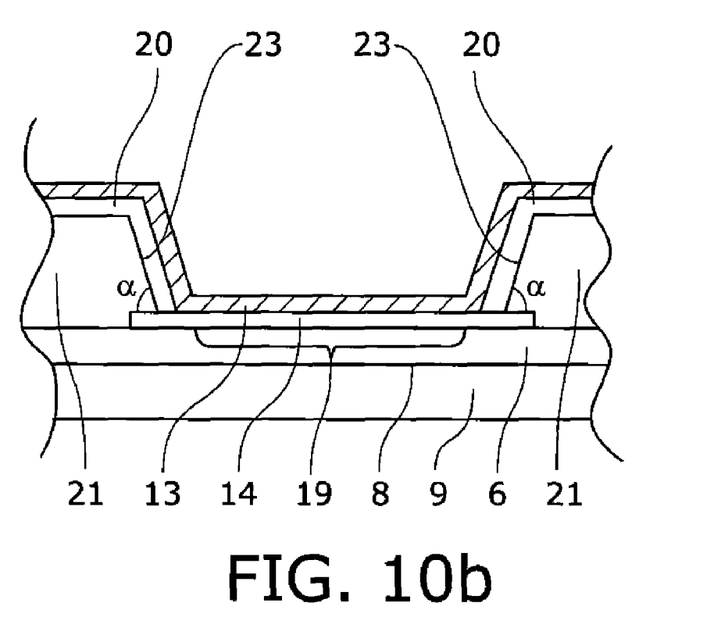
FIG. 10b shows a cross-section of a part of an electrowetting element according to a further embodiment of the invention.

In a further embodiment of the invention shown in FIG. 10b, the inclined walls are covered with the at least one reflective area of the structured reflector 20.

Although most examples of cross-sections shown in the above embodiments are rectangular, it will be clear that any shape is possible, in particular round and oval shapes are possible and/or corners may be rounded.

The above embodiments of the display device have the electrode 14 arranged on the second support plate 6 and the second fluid 12 situated at the rear side of the space 10 of the electrowetting element. Alternatively, the electrode may be arranged on the first support plate 5 and the second fluid at the viewing side of the space 10.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. Transflective electrowetting display device having a viewing side and a rear side and comprising a plurality of electrowetting elements having a first support plate facing the viewing side and a second support plate facing the rear side, each electrowetting element comprising:

a space between the first support plate and the second support plate and including a first fluid and a second fluid immiscible with each other, the second fluid arranged on the second support plate, the second fluid absorbing at least a part of the optical spectrum, the space having a boundary in the plane of the second support plate and the position of the second fluid being controllable to cover a predetermined area within the boundary and to uncover a further area within the boundary, a structured reflector arranged on the second support plate, covered by the second fluid, comprising within the boundary at least one area transmissive for light incident from the rear side and at least one area reflective for light incident from the viewing side, the at least one transmissive area and the at least one reflective area being arranged such that the predetermined area covered by the second fluid covers a proportion of the at least one transmissive area and a substantially same proportion of the at least one reflective area, wherein the surface of the at least one reflective area of the structured reflector is offset in the direction of the viewing side of the display device with respect to the at least one transmissive area of the structured reflector such that a thickness of the second fluid over the at least one transmissive area is greater than a thickness of the second fluid over the at least one reflective area.

2. Transflective electrowetting display device according to claim 1, wherein the thickness of the second fluid over the at least one transmissive area is at least 1.2 times the thickness of the second fluid over the at least one reflective area.

3. Transflective electrowetting display device according to claim 1, wherein the thickness of the second fluid over the at least one transmissive area is substantially equal to two times the thickness of the second fluid over the at least one reflective area.

4. Transflective electrowetting display device according to claim 1, wherein the offset between the at least one reflective area and the at least one transmissive area of the structured reflector is provided by a reflector support layer between the at least one reflective area and the second support plate, creating at least one hollow in the reflector support layer, the at least one transmissive area being at the bottom of said at least one hollow.

5. Transflective electrowetting display device according to claim 1, wherein an electrode is arranged on the second support plate in the at least one reflective area and an electrode is arranged on the second support plate in the at least one transmissive area.

6. Transflective electrowetting display device according to claim 5, wherein the second fluid over the at least one transmissive area is controllable with the same voltage as over the at least one reflective area.

7. Transflective electrowetting display device according to claim 1, wherein the second fluid over the at least one transmissive area is controllable solely by cohesive action from the second fluid over the at least one reflective area.

8. Transflective electrowetting display device according to claim 1, wherein the at least one transmissive area has an elongated shape.

9. Transflective electrowetting display device according to claim 1, wherein the area of the at least one transmissive area is less than two times the area of the at least one reflective area.

10. Transflective electrowetting display device according to claim 1, wherein the at least one transmissive area is completely surrounded by the at least one reflective area.

11. Transflective electrowetting display device according to claim 1, wherein the difference of the thickness of the second fluid over the at least one transmissive area and the thickness of the second fluid over the at least one reflective area is smaller than a width of the at least one transmissive area.

12. Transflective electrowetting display device according to claim 1, wherein the difference of the thickness of the second fluid over the at least one transmissive area and the thickness of the second fluid over the at least one reflective area is smaller than a length of the at least one transmissive area.

13. Transflective electrowetting display device according to claim 1, wherein a cross section perpendicular to the surface of the at least one transmissive area has a substantially rectangular shape.

14. Transflective electrowetting display device according to claim 13, wherein the cross section perpendicular to the surface of the at least one transmissive area has rounded corners where the side walls of the substantial rectangular shape touch the transmissive area.

15. Transflective electrowetting display device according to claim 13, wherein the cross section perpendicular to the surface of the at least one transmissive area has rounded corners where the side walls of the substantial rectangular shape touch the reflective area.

16. Transflective electrowetting display device according to claim 1, wherein a cross section perpendicular to the surface of the at least one transmissive area has a substantially trapezoidal shape as to create a hollow having inclined sidewalls.

17. Transflective electrowetting display device according to claim 16, wherein the at least one reflective area extends over the inclined side walls.

* * * * *